United States Patent [19]

Gabellini et al.

[11] Patent Number: 4,989,495
[45] Date of Patent: Feb. 5, 1991

[54] HYDRAULIC POSITIONING SYSTEM WITH NORMAL AND HIGH SUPPLY AND EXHAUST FLOW PATHS

[75] Inventors: Richard A. Gabellini, Aptos, Calif.; Lynn A. Stuart, Portland, Oreg.

[73] Assignee: Hydra-Power Systems, Inc., Portland, Oreg.

[21] Appl. No.: 397,165

[22] Filed: Aug. 21, 1989

[51] Int. Cl.$^5$ .................................................. F01B 25/02
[52] U.S. Cl. .................................................. 91/6; 91/28; 91/457; 91/462
[58] Field of Search .................. 91/6, 28, 31, 445, 457, 91/462, 461

[56] References Cited

U.S. PATENT DOCUMENTS

| | | | |
|---|---|---|---|
| 2,672,731 | 3/1954 | Ashton | 91/461 |
| 2,999,482 | 9/1961 | Bower | 91/31 |
| 3,038,449 | 6/1962 | Murphy, Jr. et al. | 91/31 |
| 3,411,411 | 11/1968 | Fleck et al. | 91/6 |
| 3,641,876 | 2/1972 | Wienke | 91/6 |
| 3,954,046 | 5/1976 | Stillhard | 91/461 |
| 3,996,840 | 12/1976 | Futamata et al. | 91/461 |
| 4,266,466 | 5/1981 | Ziems | 91/445 |
| 4,437,385 | 3/1984 | Kramer et al. | 91/461 |
| 4,819,541 | 4/1989 | Pitsch et al. | 91/6 |

FOREIGN PATENT DOCUMENTS

| | | | |
|---|---|---|---|
| 2838696 | 3/1979 | Fed. Rep. of Germany | 91/6 |
| 0771362 | 10/1980 | U.S.S.R. | 91/6 |

Primary Examiner—Edward K. Look
Assistant Examiner—John Ryznic
Attorney, Agent, or Firm—Chernoff, Vilhauer, McClung & Stenzel

[57] ABSTRACT

The hydraulic piston cylinder assembly which operates the governor of a turbine which powers a hydropower generator has a servo valve capable of flowing only a portion of its flow requirements during normal low power fluctuation conditions of the turbine's operation. During high power fluctuation conditions of the turbine's operation, such as during start-up, hydraulic fluid also flows to and from the piston and cylinder assemblies through high flow pressure and return conduits that bypass the servo valve. Control of fluid flow in the high flow conduits is accomplished by a proportional throttling valve located in the high flow return line. The servo valve and proportional throttling valve together have a flow capacity which is equal to the flow requirements of the piston and cylinder assembly and they are both actuated by the same electronic controller. However, the electronic controller only actuates the proportional throttling valve when the flow requirement of the piston and cylinder assembly exceeds the flow capacity of the servo valve. A hydraulic logic circuit activated by the electronic controller allows the high flow pressure and return conduits to be reversed for two-way operation of the piston and cylinder assembly.

8 Claims, 1 Drawing Sheet

HYDRAULIC POSITIONING SYSTEM WITH NORMAL AND HIGH SUPPLY AND EXHAUST FLOW PATHS

BACKGROUND AND SUMMARY OF THE INVENTION

This invention relates to a hydraulic linear actuation system, and in particular to a two-stage actuation system for use as a governor in a hydropower turbine.

Turbines which are driven by water under hydrostatic pressure to drive power producing generators must be operated at a specified constant rotational speed in order to generate constant frequency AC power. However, when the load fed by the generator increases the turbine will slow down, thereby decreasing the system frequency, and as the load decreases the turbine will speed up, thereby increasing the system frequency, unless the amount of water being fed to the turbine is changed in response to the change in the load. To this end power generation turbines have flow control gates at their inlets which can be opened to increase water flow to the turbine, and closed to decrease water flow to the turbine. The position of these gates has traditionally been controlled by a governor system utilizing a double-acting hydraulic piston and cylinder assembly operated by a servo valve that regulates the flow of hydraulic fluid to the piston and cylinder assembly. The servo valve in turn is controlled by an electronic controller that monitors the turbine rotational speed.

As hydropower turbines have become larger and larger, these governor systems have become increasingly expensive. When a generator first comes on line it must be brought from an essentially no-load condition to operating load in a manner of seconds or it will be destroyed. Thus, the flow control gates must be opened quickly during this transition period which requires a large piston and cylinder assembly that is supplied hydraulic fluid at a high rate. Since the servo valve which operates the piston cylinder also must accommodate this high flow rate, it must be quite large and large servo valves are extremely expensive.

The subject invention overcomes the foregoing shortcomings of the prior art hydropower turbine governor systems by utilizing a servo valve which can flow only a portion of the requirements of the piston and cylinder assembly, for controlling the piston and cylinder assembly when the turbine has reached its normal operating condition. A low flow servo valve is sufficient for this purpose since under normal operating conditions load changes are relatively small, and low flow rates of hydraulic fluid to the piston and cylinder assembly is all that is required to maintain generator synchronization.

The subject invention also provides high flow pressure and return conduits which extend from the source of pressurized hydraulic fluid and the hydraulic reservoir to the ends of the piston and cylinder assembly, bypassing the servo valve. Rather than placing a large volume servo valve in the high flow conduits, which, when combined with the low flow rate servo valve, would be nearly as expensive as the single large servo valve in the prior art systems, a lower cost proportional throttling valve is placed in the high flow return line. The throttling valve is actuated by the same controller that actuates the servo valve. The throttling valve is operated in combination with the low flow servo valve to control the piston and cylinder under high flow conditions. Thus, the system achieves the fine control of the lower capacity servo valve along with the high flow capability of the larger capacity throttling valve at considerably less expense than would result from using a large capacity servo valve.

In order to switch the source of pressurized hydraulic fluid between the rod end and blind end of the piston and cylinder assembly, and thus achieve two-way travel of the rod, a hydraulic logic switching circuit is utilized. The hydraulic logic circuit includes a first high flow pressure conduit which extends between the source of pressurized hydraulic fluid and the rod end of the piston and cylinder assembly and has a first logic valve located in it. A second high flow pressure conduit extends between the source of pressurized hydraulic fluid and the blind end inlet of the piston and cylinder assembly and has a second logic valve located in it. In addition, a first high flow return conduit, which extends between the hydraulic system reservoir and the rod end inlet of the piston cylinder, has a third logic valve located in it, and a second high flow return conduit, which extends between the hydraulic system reservoir and the blind end inlet of the piston and cylinder assembly, has a fourth logic valve located in it. The four logic valves are pilot operated, and a double-acting solenoid, which is activated by the controller whenever the proportional throttling valve is in operation, either opens the first and fourth logic valves and closes the second and third logic valves, or opens the second and third logic valves and closes the first and fourth. In the former situation pressurized hydraulic fluid flows to the rod end of the piston and cylinder assembly, and hydraulic fluid is discharged from the blind end through the proportional throttling valve, and the rod is retracted. In the latter situation the reverse occurs and the rod is extended. In either case the combined capacity of the servo valve and the proportional throttling valve is available to supply fluid to the piston and cylinder assembly.

The governor of the subject invention also includes a safety shutdown that causes the piston and cylinder assembly to immediately retract, and thus close the flow control gates and shut down the turbine, whenever power to the controller is interrupted. The safety shutdown includes a first bypass conduit that extends between the source of pressurized hydraulic fluid and the rod end inlet of the piston and cylinder assembly and has a first normally open shutdown valve located in it. A second bypass conduit extends between the reservoir and the blind end inlet of the piston and cylinder assembly and has a second normally open shutdown valve located in it. The first and second shutdown valves are pilot operated and a solenoid valve, which is actuated by the controller, provides pressure to their pilot ports when the controller is receiving power, and vents their pilot ports to the reservoir when the controller loses power. Thus, upon power loss to the controller the shutdown valves are opened and pressurized hydraulic fluid from an accumulator that is associated with the hydraulic system is directed to the rod end of the piston and cylinder assembly and the blind end is vented to retract the rod and close the flow control gates.

In addition, the safety shutdown includes vented pilot-to-close check valves in the hydraulic fluid lines associated with the servo valve. These valves are provided pilot pressure from the same solenoid valve that provides pilot pressure to the first and second shutdown valves, and thus are open when the controller has power and close when the controller loses power, to isolate the servo valve from the piston and cylinder assembly upon power loss.

Accordingly, it is a primary objective of the present invention to provide a two-stage hydraulic positioning system for a hydropower turbine governor in which a servo valve capable of flowing only a portion of the flow capacity of the governor piston and cylinder assembly is used to control the piston and cylinder assembly during normal operation of the turbine.

It is a further object of the present invention to provide such a device in which a separate larger flow capacity proportional throttling valve is used in conjunction with the lower flow capacity servo valve to control the piston and cylinder assembly during high flow conditions.

It is a further object of the present invention to utilize a hydraulic logic circuit in conjunction with the proportional throttling valve to control the direction of the piston and cylinder assembly.

It is a still further object of the present invention to provide a safety shutdown which causes the piston and cylinder assembly to be retracted when there is an interruption to the power which operates the system.

It is a yet further object of the present invention to provide such a safety shutdown which isolates the servo valve from the piston and cylinder assembly when there is an interruption of power to the system.

The foregoing and other objectives, features and advantages of the present invention will be more readily understood upon consideration of the following detailed description of the invention taken in conjunction with the accompanying drawings.

PREFERRED EMBODIMENT OF THE INVENTION

Figure 1:
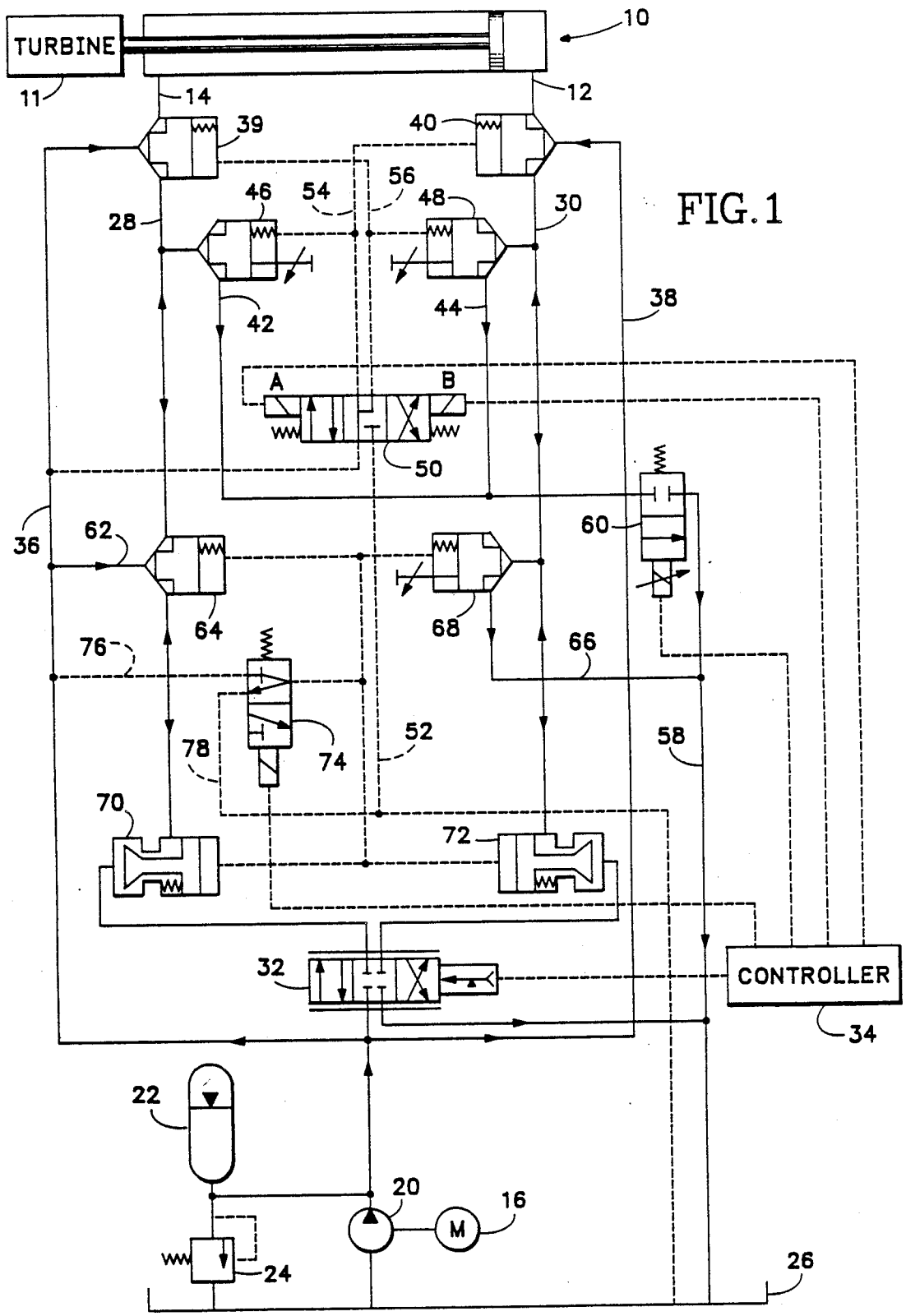
FIG. 1 is a schematic view showing a hydraulic positioning system for a hydraulic turbine governor embodying the features of the subject invention.

Referring now to the drawings, the subject invention comprises a double-acting piston and cylinder assembly 10 which is used to open and close the flow control gates of a large fully regulated hydropower turbine 11. When pressurized hydraulic fluid is introduced to the blind end inlet 12 of the piston and cylinder assembly the piston is extended to open the flow control gates and increase water flow to the turbine, and when pressurized hydraulic fluid is introduced to the rod end inlet 14 of the piston and cylinder assembly the rod is retracted to close the gates. The piston and cylinder assembly 10 receives hydraulic fluid from a source of pressurized hydraulic fluid, such as the electric motor 16 and hydraulic pump 20 shown in the drawings. The source of pressurized hydraulic fluid preferably also includes a passive component, such as the accumulator 22 shown in the drawings, which provides a source of pressurized fluid for a short period of time after power is lost to the electric motor 16. Pressure in the accumulator is regulated by a conventional pressure relief valve 24. The hydraulic system draws fluid from, and returns fluid to a reservoir 26.

A portion of the fluid requirements of the piston and cylinder assembly 10 is provided through a first fluid conduit 28 which is connected to the rod end inlet 14, and a second fluid conduit 30, which is connected to the blind end inlet 12. The first and second fluid conduits are connected to the pump 20 through a four-way, three position, electrically activated servo valve 32, which is controlled by a microprocessor controller 34. The controller monitors the rotational speed of the turbine, and keeps it constant by selectively shifting the servo valve 32 in response to changes in load. Controllers of this type are common with linear hydraulic actuation systems and can be constructed by one skilled in the art. In one position the servo valve 32 connects the pump 20 to the first fluid conduit 28 and the reservoir 26 to the second fluid conduit 30, thereby causing the rod to retract. In a second position the servo valve 32 connects the pump 20 to the second fluid conduit 30 and the reservoir 26 to the first fluid conduit 28, thereby causing the rod to extend. In a third position, which is the center, non-excited position, the first and second fluid conduits are isolated from the hydraulic system. The servo valve 32 is sized to flow between 10 and 30 percent of the capacity of the piston and cylinder assembly 10 and is the entire control system during normal operation of the turbine 11, when regulation of the flow control gates is only required to maintain generator synchronization in response to minor fluctuations in power demand. In most applications the servo valve 32 is sized to flow 25% of the capacity of the piston cylinder assembly 10.

The remainder of the piston and cylinder assembly flow requirements is provided through high flow pressure conduits which receive pressurized hydraulic fluid from the pump 20, and high flow return conduits which return hydraulic fluid to the reservoir 26. A first high flow pressure conduit 36 is connected to the rod end inlet 14 and a second high flow pressure conduit 38 is connected to the blind end inlet 12. A first logic valve 39 is located in the first high flow pressure conduit 36 and a second logic valve 40 is located in the second high flow pressure conduit 38. A first high flow return conduit 42 is connected to the rod end inlet 14, and a second high flow return conduit 44 is connected to the blind end inlet 12. A third logic valve 46 is located in the first high flow return conduit 42 and a fourth logic valve 48 is located in the second high flow return conduit 44.

The four logic valves 39, 40, 46 and 48 are normally open, pilot actuated valves and are actuated simultaneously so that either the first and fourth logic valves 39, 48 are closed and the second and third logic valves, 40, 46 are open, or the second and third logic valves are closed and the first and fourth are open. Actuation of the four logic valves is accomplished by a four-way, three position double solenoid valve 50. The inlet of the double solenoid valve 50 is connected to the first high flow pressure conduit 36. One outlet is connected to the reservoir 26 through a drain conduit 52, a second outlet is connected to the pilot ports of the first and fourth logic valves 39, 48 through a first pilot conduit 56, and the third outlet is connected to the pilot port of the second and third logic valves 40, through a second pilot conduit 54. When the "A" coil of the double solenoid valve 50 is energized by the controller 34, pilot pressure is supplied to the pilot ports of the second and third logic valves, and they are closed, and the pilot ports of the first and fourth logic valves are vented, and they are opened. Conversely, when the "B" coil of the double solenoid valve is actuated by the controller, pilot pressure is supplied to the pilot ports of the first and fourth logic valves, and they are closed, and the pilot ports of the second and third logic valves are vented, and they are open. When neither coil is actuated, pilot pressure is supplied to the pilot ports of all four logic valves and they all are closed.

The first and second high flow return conduits 42, 44 join into a common return conduit 58 which has a proportional throttling valve 60 located in it. So long as the flow requirements of the piston and cylinder assembly 10 can be handled by the servo valve 32, the controller 34 does not energize the throttling valve 60 or the double solenoid valve 50. Thus, control is accomplished by the servo valve 32 exclusively. However, when sufficient load fluctuation is experienced by the turbine 11 so that the servo valve 32 is no longer able to supply the flow requirements of the piston and cylinder assembly 10, the controller 34 actuates the throttling valve 60 and either the A or B coil of the double acting solenoid 50. The controller 34 then selectively actuates both the servo valve 32 and the throttling valve 60 in order to utilize their combined capacity in controlling the position of the piston and cylinder assembly 10.

Since flow of hydraulic fluid to the piston and cylinder assembly 10 is controlled by two valves, they both can be smaller than would be required if flow was controlled by a single control valve. Thus, the control valves are considerably less expensive. In addition, since one of the two control valves is smaller than the other, and this valve controls the flow of hydraulic fluid to the piston and cylinder assembly under most conditions, the larger control valve is seldom used. Thus, the larger control valve, which is the more expensive of the two, experiences little wear and is long lived. Finally, since the smaller valve is always in the system, it can be the only servo valve in the system and the larger valve can be a less expensive proportional throttling valve. For all of these reasons, the control valve cost of the subject invention is much less than it is with the prior art single valve devices.

In addition, since the control of hydraulic fluid to the piston and cylinder assembly is accomplished by a smaller valve under most conditions, greater control is possible since small changes in flow require larger movements of the valve than would be required with a single larger valve. Thus, the double control valve system of the present invention is capable of greater regulation than would be possible with a single control valve system.

The positioning system of the present invention also includes a safety shutdown which causes the piston and cylinder assembly 10 to be retracted, and thus close the flow control gates on the turbine 11, in the event there is a loss of power to the controller 34. The safety shutdown includes a first bypass conduit 62 which extends between the first high flow pressure conduit 36 and the first fluid conduit 28 through a first shutdown valve 64. In addition, a second bypass conduit 66 extends between the common return conduit 58 and the second fluid conduit 30 through a second shutdown valve 68. A third shutdown valve 70 is placed in the first fluid conduit 28, between the first shutdown valve 64 and the servo valve 32, and a fourth shutdown valve 72 is placed in the second fluid conduit 30, between the second shutdown valve 68 and the servo valve 32.

The first and second shutdown valves 64, 68 are normally open, pilot controlled logic valves, and the third and fourth shutdown valves are vented pilot-to-open check valves. The pilot ports of all four shutdown valves are connected to one outlet of a two position, three-way solenoid valve 74. The inlet of the solenoid valve 74 is connected to the high flow pressure conduit 36 through a shutdown conduit 76, and the other outlet is connected to the drain conduit 52 through a shutdown drain conduit 78. The solenoid valve 74 is actuated to the pressure position by the controller 34 whenever there is power to the controller, and shifts to the drain position when power to the controller is interrupted. Loss of power to the controller, therefore, closes the second and third shutdown valves 70, 72, and isolates the servo valve 32 from the piston and cylinder assembly 10. Thus, even if the servo valve 32 malfunctions it will have no effect on the piston and cylinder assembly. In addition, the first and second shutdown valve 64, 68 will be vented and thus opened. As a result, pressurized hydraulic fluid is provided to the rod end of the piston and cylinder assembly through first shutdown valve 64, and the blind end of the piston and cylinder assembly is drained to the reservoir through the second shutdown valve 68, thereby retracting the rod and closing the turbine flow control gates.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A positioning system for a governor for a hydropower turbine, comprising:
 (a) a double acting piston and cylinder assembly having an extensible rod, and having a rod end inlet, to which the application of pressurized hydraulic fluid will cause the rod to be retracted, and a blind end inlet, to which the application of pressurized hydraulic fluid will cause the rod to be extended;
 (b) a source of pressurized hydraulic fluid for supplying hydraulic fluid under pressure to said system, and a reservoir for receiving hydraulic fluid from said system and for supplying hydraulic fluid to said source;
 (c) a first fluid conduit which extends from said rod end inlet and a second fluid conduit which extends from said blind end inlet;
 (d) servo control valve means for selectively interconnecting said source to said first fluid conduit and said reservoir to said second fluid conduit, or connecting said reservoir to said first fluid conduit and said source to said second fluid conduit, and for regulating the flow rate of hydraulic fluid therethrough;
 (e) a first high flow pressure conduit interconnecting said source to said rod end inlet, and a first logic valve interposed in said first high flow pressure conduit;
 (f) a second high flow pressure conduit interconnecting said source to said blind end inlet, and a second logic valve interposed in said second high flow pressure conduit;
 (g) a first high flow return conduit interconnecting said reservoir to said rod end inlet, and a third logic valve interposed in said first high flow return conduit;
 (h) a second high flow return conduit interconnecting said reservoir to said blind end inlet, and a fourth logic valve interposed in said second high flow return conduit;

(i) proportional throttling valve means for regulating the flow rate of hydraulic fluid through said first and second high flow return conduits; and (j) actuation means for simultaneously opening said first and fourth logic valves and closing said second and third logic valves, or simultaneously opening said second and third logic valves and closing said first and fourth logic valves.

2. The apparatus of claim 1 wherein said first, second, third and fourth logic valves are pilot actuated and said actuation means comprises four-way, three-position double solenoid valve.

3. The system of claim 1 wherein the flow capacity of said servo control valve means is between 10% and 30% of the capacity of said piston cylinder assembly.

4. The system of claim 1 wherein the flow capacity of said servo control valve means is 25% of the capacity of said piston and cylinder assembly.

5. The system of claim 1 including:
(a) a first bypass conduit interconnecting said rod end inlet and said source;
(b) a first normally open shutdown valve interposed in said first bypass conduit;
(c) a second bypass conduit interconnecting said blind end inlet and said reservoir;
(d) a second normally open shutdown valve interposed in said second bypass conduit; and
(e) means for closing said first and second shutdown valves during normal operation of the system.

6. The system of claim 5 including:
(a) a third normally closed shutdown valve interposed in said first fluid conduit;
(b) a fourth normally closed shutdown valve interposed in said second fluid conduit; and
(c) means for opening said third and fourth shutdown valves during normal operation of the system.

7. The system of claim 6 wherein said first, second, third and fourth shutdown valves are pilot actuated and said means for closing said first and second shutdown valves, and for opening said third and fourth shutdown valves comprises a two-position three-way solenoid valve.

8. The system of claim 7 wherein said source includes passive means for providing pressurized hydraulic fluid.

* * * * *